April 4, 1961 H. C. J. FOCKE 2,978,037
STABILIZING MEANS FOR HELICOPTER AIRCRAFT
Filed Feb. 12, 1958 4 Sheets-Sheet 1

INVENTOR
HENRICH CARL JOHANN FOCKE

BY Toulmin & Toulmin

ATTORNEYS

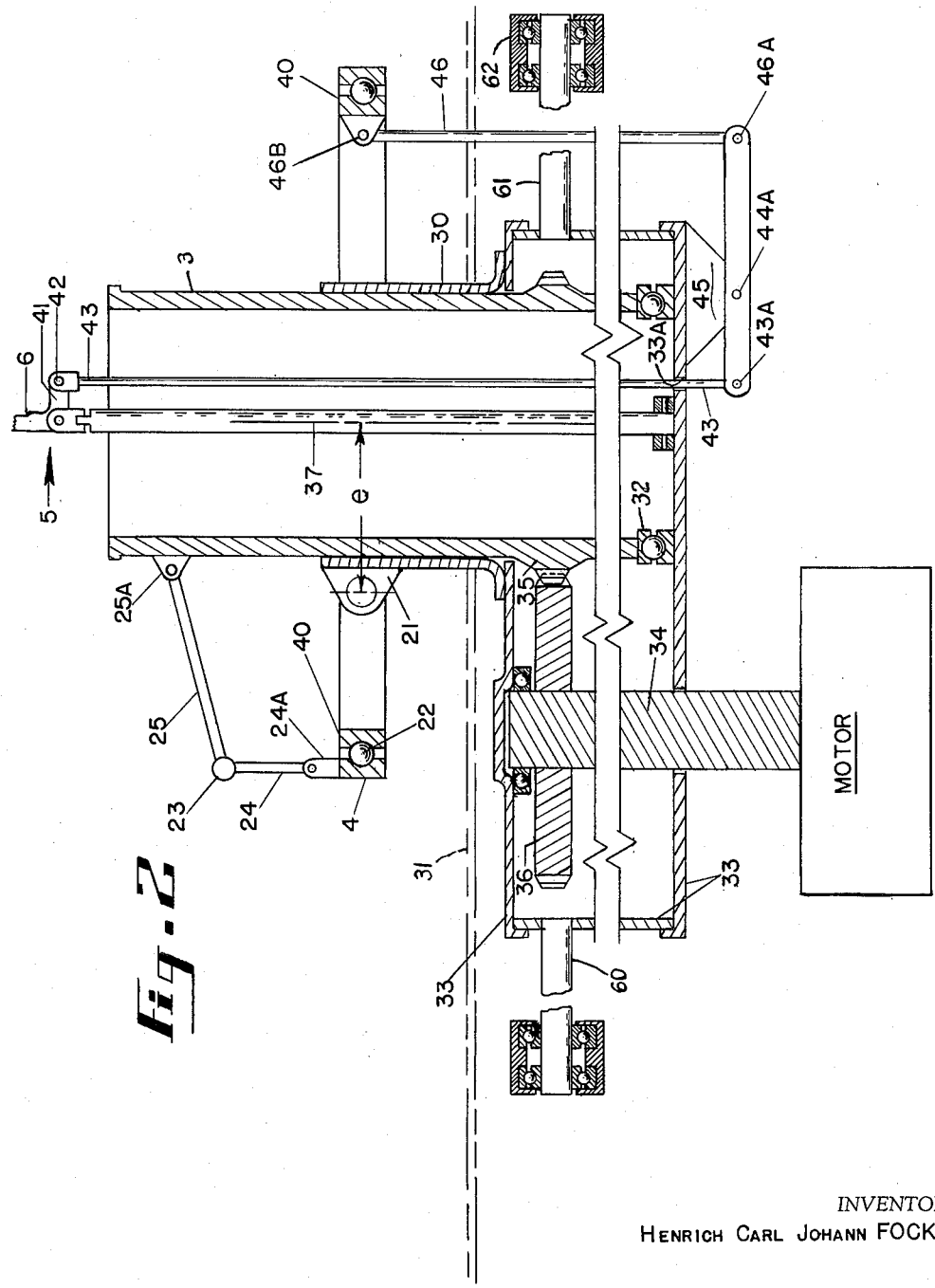

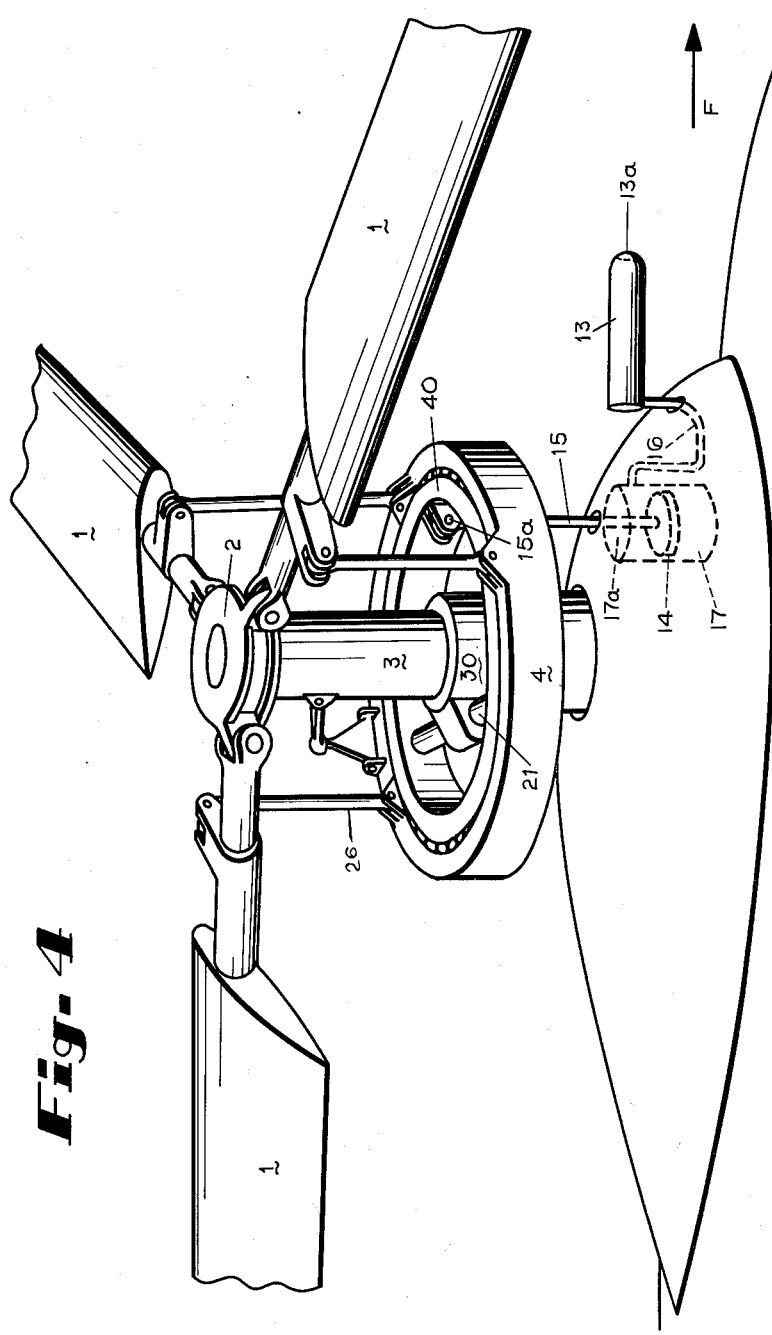

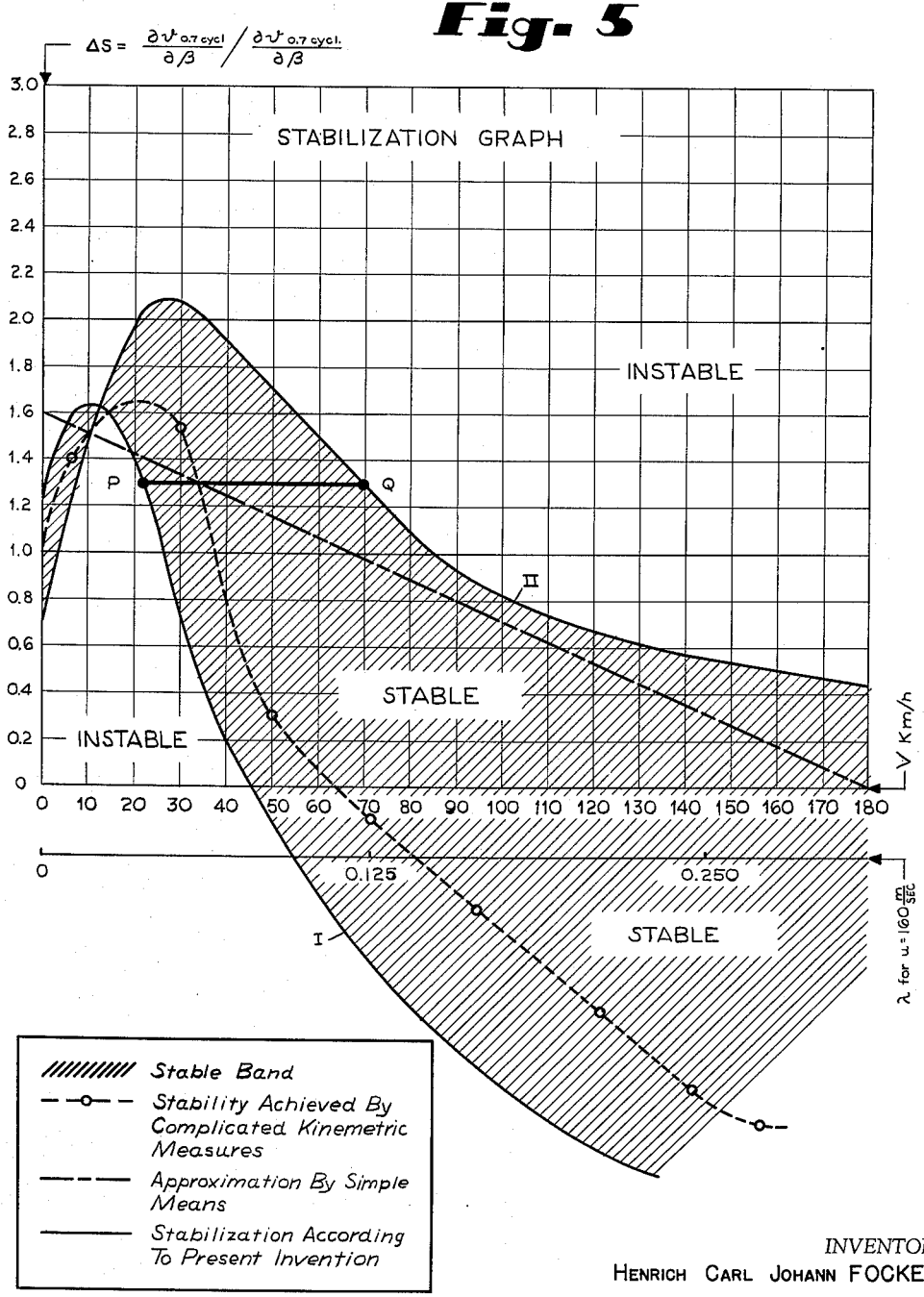

United States Patent Office 2,978,037
Patented Apr. 4, 1961

2,978,037

STABILIZING MEANS FOR HELICOPTER AIRCRAFT

Heinrich Carl Johann Focke, Bremen, Germany, assignor to Ministerio da Aeronautica Diretor do Material, Aeroporto Santos-Dumont, Rio de Janeiro, Brazil Filed Feb. 12, 1958, Ser. No. 718,939

7 Claims. (Cl. 170—160.15)

This invention relates to improved stabilizing means for helicopter flying machines.

This application is a continuation-in-part of my pending patent application Serial No. 411,501 filed February 19, 1954, now abandoned.

It is an object of my invention to provide improved stabilizing means for helicopter flying machines which permits to maintain a perfect dynamic stability of the helicopter.

It is a further object of the invention to provide improved stabilizing means in a helicopter flying machine for the purpose described, which means further permit in a simple manner to effect simultaneously both a cyclic and a collective pitch adjustment of the blades of a multi-blade rotor of a flying machine, whereby both the direction and the magnitude of the resultant aerodynamic forces acting on the machine are maintained constant.

Helicopter flying machines are generally provided with a rotor or rotors each having a plurality of blades, such as, for instance, three or four, and which blades are pivotally connected to the hub of the rotor. Consequently, when the latter rotates in an air flow generated by the movement of the airplane through the air, for instance in forward horizontal direction, the blades moving through the upstream side portion of their circular path, i.e. the blade moving forward through the air current with the leading edge of the blade directed upwardly and the trailing edge directed downwardly, so as to receive an upwardly lifting force component, are tipped upward, and those blades moving through the downstream portion, i.e. toward the rear of the plane against the direction of flight of the latter, are forced downward by the action of the air upon the blades. This results in an inclination of the axis of the geometrical cone surface described by the blades and referred to hereinafter as the "blade cone" for the sake of brevity.

The inclination of the blade cone axis corresponds to an inclination of the direction of the lifting force of the rotor or of the resultant of the lifting forces of the rotors where there is more than one rotor provided with the machine, due to the existing equality of centrifugal forces of the several blades constituting the rotor.

Since the center of gravity of the helicopter machine is located below the apex of the aforesaid blade cone, the inclination of the lifting force causes the tendency toward pendular movements of the machine which may become so high that the weak outside damping forces of the air available during a disturbance in the position of equilibrium of the machine are no longer sufficient for maintaining the necessary dynamic stability.

The typical behaviour of the blades of the rotor not only causes a change in direction but also in magnitude of the lifting force and this is, as well as the change of direction of said force, harmful for the steady movement of the aircraft.

Such change in magnitude of the lifting force causes, in forward flight, an up- and downward oscillation of the center of gravity and thus a sinusoidal movement of the helicopter in a vertical plane.

Thus, in order to obtain a steady flight of the helicopter, it is necessary to compensate the effects of both the change of direction as well as the change of magnitude of the resultant lifting forces.

While the compensation of the direction of the lifting forces is achieved by cyclic pitch variation, the compensation of the magnitude of the lifting forces can be realized by collective pitch variation of the rotor blades of the helicopter.

Now, I have discovered that, at the critical speeds between approximately 20 and 70 km. per hour, the relationship between the direction and the magnitude of the lifting forces, and consequently, between the rates of collective and cyclic pitch variation, can be considered constant, so that the change of collective pitch variation with the air speed is sufficient to determine the required stabilization, if collective pitch variation and cyclic pitch variation are effected simultaneously.

Various means have already been proposed for suppressing the resultant undersirable lack of dynamic stability. Thus it has been suggested to convert the tilting movement of the blade cone due to the forces due to the air flow past the machine, i.e. the velocity of the machine relative to the air or "relative velocity," into a variation of the position of an element of the machine acting contrary to the high restoring moments, such as the elevator of a normal flying machine.

On the other hand, it is well known in the art, for instance as described in the Patent 2,439,089 to Hodson, to effect simultaneously a cyclic and collective adjustment of the pitch of the blades of a helicopter multi-blade rotor for steering purposes. This is done by a control device comprising a downwardly extending rod connected by a universal joint to the center of the propeller hub and bearing a sleeve slidably mounted on the rod and pivotably connected by a number of links to the individual propeller blades, whereby the rod coincides always with the axis of the above-mentioned blade cone.

Furthermore, the lower end of the rod is pivotally connected to a servo-device controlling the angular position of a ring which is cantable relative to a plane transverse at right angle to the hub axis, and connected by articulated arms to the blades for varying the pitch of the latter. Separate hydraulic means are also required for control of the flap angle of the blades relative to the hub axis, i.e. the degree of slope of the blade cone relative to the central cone axis.

This control is effected by raising or lowering a spherical bearing supporting the aforesaid cantable ring.

In known devices of this type, the blade cone is used as a steering device and, if the pilot would intend to use the same as a stabilizing device as proposed, it would be necessary for him to hold the steering bar or handle rigidly in a determined neutral position. If he attempts to do so, collective pitch variation becomes dependent upon the movement of the aforesaid sliding sleeve on the rod representing the axis of the blade cone without there being provided a fixed ratio between the cyclic and the collective pitch variations. This leads to a superimposition of the steering and stabilizing effects which has most unpleasant effects on the pilot who is constantly under the impression that the flying machine is uncontrolledly carrying out manoeuvres contrary to his will. This conflict between intended steering and automatic control of the machine is particularly undesirable if the machine flies through gusty wind or gale.

Furthermore, I have proposed, for instance, in my German Patent 950,169, to provide separate steering means in a helicopter flying machine, independent of the rotor head, so that the rotor itself becomes available besides its helicopter-sustaining function, exclusively for effecting a reduction of the pendular movements and vertical drops.

This known arrangement suffers from the drawbacks of requiring a plurality of separate control devices with inherent increase in the possibility of faulty operation, and further from the drawback that it does not permit the craft to obtain perfect dynamic stability.

Thus, the inclination of the blade cone in the known construction may control, by automatic variation dependent on the relative velocity of the machine in air, the angular position of the aforesaid cantable ring, thereby producing a cyclic variation of the propeller blade pitch.

However, although the direction of the resultant lifting force is thereby made independent of the relative velocity, this does not apply as far as the magnitude of the lifting force is concerned.

I provide a stabilizing system for adjusting simultaneously (a) collectively the pitch of the blades of a helicopter rotor, and (b) the cyclic pitch variation of the blade or several blades thereof, which stabilizing system comprises a simple arrangement of an inner annular member cantable about a fixed eccentric axis, and an outer annular member rotatably disposed about said inner annular member and connected by articulated linking members to the blades of a helicopter rotor for variation of the pitch of the latter.

A preferred embodiment of my invention further comprises rod means for indicating the inclination of the blade cone and for automatically converting that inclination into a simultaneous interdependent adjustment of the collective pitch and the individual pitch variation of the rotor blades.

In another embodiment of the invention there is further provided an element for measuring simultaneously the change in the direction and, in the aforesaid ratio thereto, the magnitude of the lifting forces, by determining the relative speed of the machine in air, and operating means for changing the inclination of the aforesaid outer annular member about the said eccentric axis and relative to the rotor shaft.

This air-speed measuring element may, for instance, comprise a piston working in a cylinder which has an open end or nozzle-like mouth piece directed toward the air current past the machine.

A hydraulic power transmission connected to this piston then engages the aforesaid eccentrically mounted annular members, in such a manner that, upon adjustment of the position of the annular members relative to the eccentric axis a variation of the average angle of attack of the propeller blades (or pitch of the blade relative to the longitudinal blade shaft axis) is effected dependent on the position of the aforesaid piston in the cylinder, i.e. on the relative velocity of the machine in the air.

Thus, due to the rotary movement of the outer annular member about the inner one when the plane in which the latter extends, is at an oblique angle relative to the propeller hub axis, i.e. canted about the eccentric axis, both the cyclic pitch variation and the collective pitch of the propeller blades are simultaneously changed.

By a suitable selection of the rate of eccentricity of the eccentric axis, i.e., its distance from the aforesaid hub axis, the amount of collective pitch can be determined in conformity with the above mentioned ratio of cyclic to collective pitch variation, and is preferably such that the amount of collective pitch variation is by 20% larger than the effected cyclic pitch variation. The ratio between the longest and the shortest part of the ring diameter normal to and divided by the eccentric axis is, therefore, in the order of 1.25.

The invention will be better understood from the description thereof following hereinafter in connection with the accompanying drawings, in which Figure 1 is a perspective view of a helicopter propeller mounted on the propeller-bearing portion of a helicopter flying machine and comprising a mechanical stabilizing system according to the invention;

Figure 2 is a longitudinal section view of the arrangement shown in Figure 1;

Figure 4 shows, also in perspective, a hydraulic system as in Figure 3 but in which the blade cone indicating means are replaced by air flow measuring means.

Figure 1:
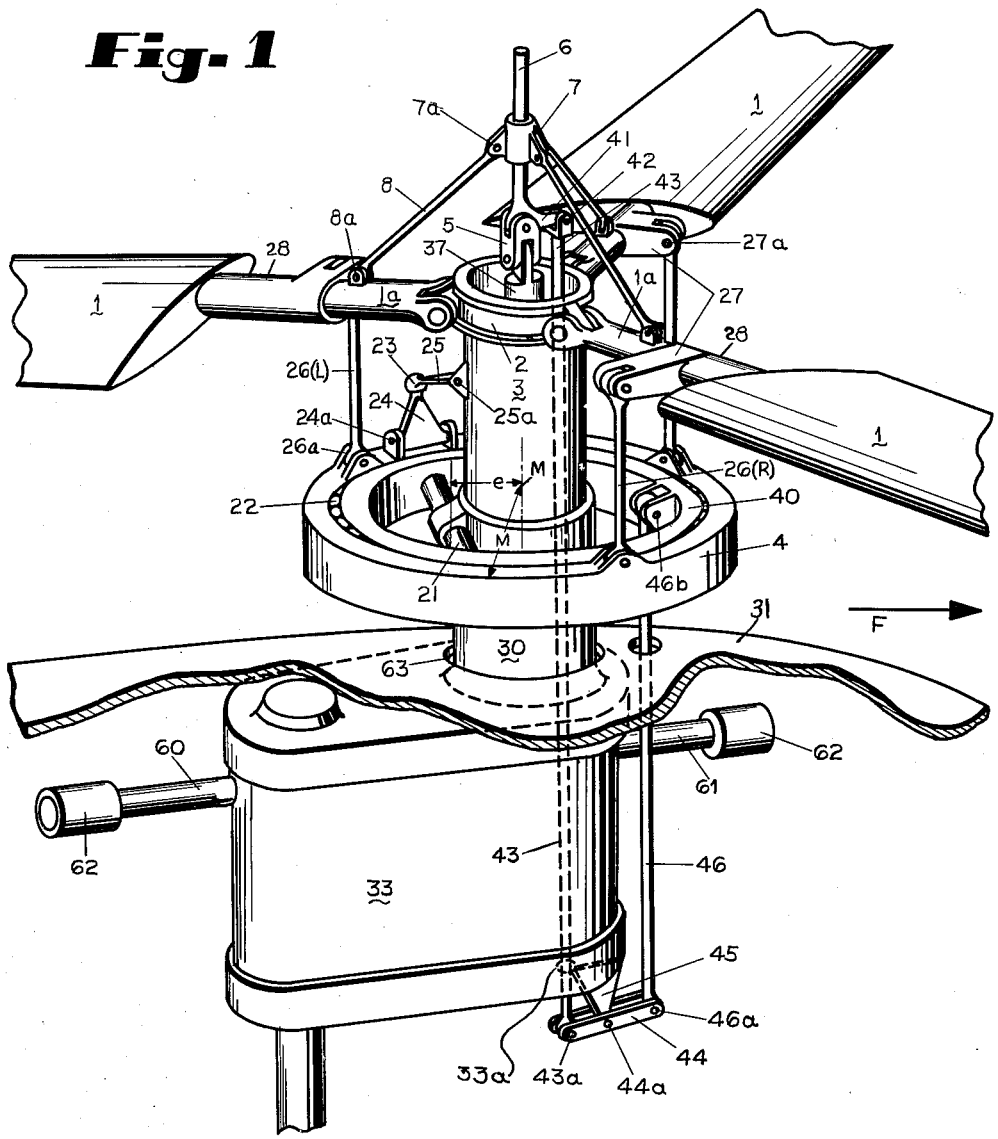

Now describing the embodiment comprising a measuring element for determining the inclination of the blade cone, Figures 1 and 2 show the main rotor head of a helicopter comprising a rotor having blades 1 connected in a conventional manner pivotably to the rotor hub 2, which is rigidly mounted on the hollow rotor shaft 3 for rotation with the latter in a stationary shaft sleeve 30. This sleeve is mounted on a gearbox 33 inside the hull 31 of the machine and through an opening 63 in the hull. Hollow shaft 3 is supported by rolling contact bearing means 32 as shown in Figure 2 (for instance, ball or roller bearings) against the wall of the gear box 33, and receives its rotary movement from a power shaft 34 via a gear train comprising, for instance, gears 35 and 36.

On the wall of gear box 33, or at another suitable portion, for instance of hull 31, there is rigidly mounted a rod 37 which extends upwardly through hollow shaft 3 coaxially with the latter. At its upper end, rod 37 bears a toggle joint 5 to which an inclinable rod 6 is attached for displacement in any direction and inclination at an angle between the axis of rod 37 and shaft 3, on the one hand, and a plane at right angle thereto and passing through the toggle joint 5, on the other hand.

Rod 6 bears a sleeve 7 which is slidably displaceable on rod 6 and is connected via articulated joints 7a to a number of links 8 which are articulatedly connected at 8a to the blade shafts 1a.

At its upper end, shaft sleeve 30 bears a transverse shaft 21 which is displaced by an eccentricity e from the common center M of two concentrically disposed annular members or rings 4 and 40, of which the outer ring 4 is mounted about the inner ring 40 for rotation thereabout by rolling on intermediary rolling contact bearings, for instance ball bearings 22.

Outer ring 4 is connected via an articulated toggle joint 23 between links 24 and 25 to the hollow shaft 3, link 24 being pivotally connected to ring 4 at 24a, and link 25 being also pivotally connected at 25a to shaft 3.

Outer ring 4 is furthermore connected at pivot points 26a to one end of link rods 26 while the other end of each of link rods 26 is pivotally connected at 27a to a pitch control arm 27 being an integral part of blade sleeve 28 which is rotatably mounted about blade shaft 1a and is rigidly fixed to blade 1.

At its lower end where it is mounted on toggle joint 5, blade cone indicating rod 6 is provided with an arm 41 extending at substantially right angle from rod 6. At its free end, this arm 41 is connected by pivot 42 to a lever rod 43 which forms part of the stabilizing mechanism according to the invention. Lever rod 43 extends downwardly through hollow shaft 3 and is pivotally connected at its lower end at 43a to one arm of a transverse double arm lever 44 having its fulcrum 44a at a nose portion 45 of casing 33. The other arm of lever 44 is pivotally connected at 46a to an upwardly extending lever rod 46, the upper end of which is connected at 46b to inner ring 40.

The stabilizing effect of this arrangement will be briefly described hereinafter. When the blade cone formed by blades 1 is slightly inclined in rearward direction in Figure 1, forward flight taking place in the direction of arrow F therein, lever 26 (R) attempts to raise the right side of rings 4 and 40 (always as seen in Figure 1) and lever 26 (L) tries to lower the left side of these rings. Rod 6 will thus be inclined toward the left, the free end of arm 41 will be raised and pull rod 43 and end 43a of lever 44 upwardly. Consequently, the end 46a of lever 44 will pull rod 46 downwardly, and, since the upper end 46b of this rod is attached to the right side of inner ring 40, it will pull this side of ring 40 as well as ring 4 downwardly, trying to turn these rings about eccentric axis 21 and thus counteracting at least partly the upwardly pulling effect of levers 26 (R), until a dynamic equilibrium of forces has been established.

With respect to the movement of the rod 6 in the embodiment of Figure 1, it is pointed out that when the helicopter aircraft is moving in a forward direction, the rotor blade moving forwardly with respect to the movement of the vehicle will be forced upwardly, whereas the rotor blade moving rearwardly will be forced downwardly. Thus, the geometric cone formed by the rotor blades will be tilted in a rearward direction. However, the metal shaft of the rotor blades will not be moved, and its axis will remain in a vertical position. The axis, however, of the geometric cone of the rotor blades will be tilted in a vertical plane extending longitudinally of the helicopter. The tilting of the geometric cone of the blades will depend upon the forward speed of the rotor. Thus, as viewed in Figure 1, the rod 6 will indicate the position of the axis of the geometric cone formed by the rotary blades. Accordingly, the position of the rod 6 is responsive to the velocity of the aircraft in a horizontal direction with respect to the ambient air. Thus, the rod 6 indicates the relative speed of the helicopter.

The inclination of the cone formed by the blades is not a matter of chance but is dependent upon the relative speed of the aircraft. According to the present invention, the position of the cone of the blades is varied so as to bring the helicopter back to dynamic stability. The original impulse for changing the position of the swash ring 4, 40 by tilting around its eccentric axis 21 is derived from the tendency of the rotor blades to form the geometric cone with its axis tilted rearwardly. Since the axis of the geometric cone is clearly related to the forward speed of the aircraft, the tilting of the swash ring will result in the blade cone assuming a new position which will also be related to forward speed. The new position of the blade cone, however, will be different from the position which would be assumed by the blade cone if the tilting means of the swash plate 4, 40 were not present.

The new position of the blade cone is thus related to the forward speed of the aircraft. However, with any different collective and cyclic pitch, there is another corresponding position of equilibrium of the geometric cone. This occurs because the position of the blade cone not only depends upon forward speed of the aircraft but also upon the pitch of the blades.

Figure 3:
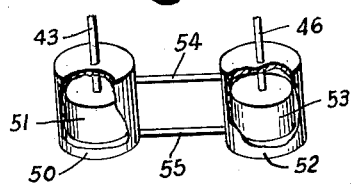
Figure 3 shows in perspective and fragmentarily a similar view as in Figure 1, in which the aforesaid mechanical system is replaced by a hydraulic system.

In Figure 3, the mechanical lever system of Figures 1 and 2 is replaced by a hydraulic system comprising a cylinder 50 and a piston 51 therein fastened at the lower end of rod 43, and a cylinder 52 and piston 53, the latter being fastened to the lower end of rod 46. Hydraulic fluid fills the cylinder spaces above and below pistons 51 and 53 and can be shifted from cylinder 50 to 52 and back through fluid conduits 54 and 55. Thus, if piston 51 is lowered by rod 43 it presses fluid through conduit 55 and raises piston 53 in cylinder 52 and together therewith also rod 46.

Thus, the inclination of rings 4 and 40 about eccentric axis 21 is varied in synchronism with the swinging movements of rod 6 about toggle joint 5 in the vertical longitudinal center plane of the flying machine, or parallel to this plane, if the helicopter is equipped with two rotors. This variation of the angular position of the ring effects a cyclic pitch variation of the propeller blades in the sense of a correction of the angle by which the propeller blades are tipped by the air flow attacking at the blade surfaces.

The entire gear box 33 together with the rotor arrangement borne by the same is pivotably mounted by means of pins 60 and 61 in bearings 62, and can be tilted about pins 60, 61 by a known steering device (not shown) which can be operated by the pilot to achieve a desired rolling motion of the helicopter. Directional and elevational steering is effected by control means mounted in other parts of the helicopter. Consequently the blade pitch arrangement of the main rotor head is reserved entirely for stabilizing the machine.

Furthermore, the influence of the air currents in a direction other than the longitudinal (forward) direction of the flying machine, can also be utilized for the correction of the direction of the resulting lifting force.

Figure 4 illustrates an embodiment comprising means by which the direction as well as the magnitude of the resulting lifting force may be corrected in accordance with the forces of air flow (and, therefore, in conformity with the relative velocity of the machine in the air) so as to reduce the pendular movements and vertical drops of the machine.

Like numerals in this Figure 4 indicate the same parts as in the other figures. The means for measuring relative velocity comprise a cylinder 13 facing with an open nozzle-like end 13a the air flow past the helicopter flying in the direction of arrow F.

Conduit 16 connects cylinder 13 with cylinder 17 in which piston 14 is raised or lowered depending on the strength of the air current entering cylinder 13 through nozzle 13a. Cylinder 17 communicates freely with the outside at its upper end 17a.

Piston rod 15 which is connected to piston 14 protrudes from the open end cylinder 17 and has its upper end connected to the inner ring 40 at pivot 15a. In this arrangement the displacements of piston 14 in cylinder 17 under the air flow entering the cylinder 13, effect a downward canting movement of the right hand side of rings 40 and 4 (in Figure 4) about eccentric axis 21, thus causing simultaneously a collective variation of the medium angle of attack of the air flow on the propeller blades 1, and also a cyclic variation in the adjustment of these blades, both variations being dependent on the relative velocity as measured. The greater the measured relative velocity, the greater the downward tilting of the rings 40 and 4 to counteract effects of the velocity.

It will be understood that the various constructions shown in the drawings, are only given by way of example and are not restrictive, since obviously, various alternative embodiments are possible within the scope of the appended claims.

What I claim is:

1. In a helicopter aircraft having at least one rotor having a plurality of blades mounted on a hub, the improvement of stabilizing means for stabilizing the aircraft by influencing the cyclic and collective pitch adjustment of said blades in response to the horizontal speed of the aircraft relative to the air, said stabilizing means comprising in combination, eccentrically cantable annular means having a canting axis, said canting axis arranged eccentrically of the center of said annular means and spaced from the rotary axis of the hub at a right angle thereto, air speed responsive means responsive to the velocity of the aircraft relative to the air during substantially horizontal movement of the aircraft and comprising a member capable of adopting varying positions relative to said hub in accordance with the horizontal speed of the aircraft, means for connecting said air speed responsive means to said eccentrically cantable annular means to transmit changes of position of said responsive means into a canting movement of said annular means around said eccentrically arranged canting axis, and link members extending from said annular means to said blades for converting the canting action of said annular means to the cyclic and collective variations of the pitch of said blades, the ratio of a given cyclic pitch variation to the corresponding collective pitch variation being determined by the eccentricity of said eccentrically arranged axis from the center of said annular means.

2. In a helicopter aircraft having at least one propeller having a plurality of blades mounted on a hub and means for cyclically and collectively varying the pitch of the blades, the stabilizing means as claimed in claim 1 wheresaid air speed responsive means comprise a cylinder and a piston movable therein, a pitot tube located in the air flow with its open end facing forward in the direction of movement of the aircraft, said cylinder being connected to said pitot tube, and means for adjusting the position of said annular means about said eccentric axis by transmitting changes in the position of said piston in said cylinder to said annular means.

3. In a helicopter aircraft having at least one propeller having a plurality of blades mounted on a hub and means for cyclically and collectively varying the pitch of the blades, the stabilizing means as claimed in claim 1 wherein said air speed responsive means comprise a cylinder and a piston movable therein, a pitot tube located in the air flow with its open end facing forward in the direction of movement of the aircraft, said cylinder being connected to said pitot tube, and means for connecting said piston to said annular means to vary the inclination of said annular means about said eccentric axis relative to said hub so as to effect simultaneously collective and cyclic pitch variations of the rotor blades in a predetermined ratio.

4. In a helicopter aircraft having at least one rotor having a plurality of blades mounted on a hub, and means for cyclically and collectively varying the pitch of said blades, the stabilizing means as described in claim 1, wherein said measuring means comprise a tiltable rod, a sleeve longitudinally displaceably arranged on said rod, articulated means for connecting said sleeve to said blades, a stationary column mounted inside said hub, a toggle joint at the top of said column and having the lower end of said tiltable rod connected thereto, said rod having a laterally extending arm at its lower end, and a lever system engaging said arm and transmitting an inclination of said tiltable rod to said cantable annular means.

5. In a helicopter aircraft having at least one propeller having a plurality of blades mounted on a hub, and means for cyclically and collectively varying the pitch of said blades, the improvement of stabilizing means for stabilizing the aircraft by influencing the cyclic and collective pitch adjustment of said blades in response to the horizontal speed of the aircraft relative to the air, said stabilizing means comprising, in combination, eccentrically cantable annular ring having a canting axis arranged eccentrically to the center of said annular ring and transverse to said hub outside the rotary axis of said hub and at a right angle to the same; air speed responsive means including means having varying positions relative to fixed aircraft structure according to the speed of the aircraft; connecting means from said air speed responsive means to said eccentrically cantable annular ring for transmitting said changes of position of said air speed responsive means into a canting movement of said ring around said eccentrically arranged axis, and further connecting means comprising lever joint members from said eccentrically cantable ring to said blades for transmitting and canting action of said ring into the cyclic and collective variation of the pitch of said blades depending upon the position of said blades relative to said eccentric axis in said hub.

6. In a helicopter aircraft having at least one propeller having a plurality of blades mounted on a hub, and means for cyclically and collectively varying the pitch of said blades, the stabilizing means as described in claim 5, wherein said air speed responsive means comprise a cylinder and a piston movable therein; said eccentrically cantable ring being connected to said piston; and a pitot tube located in the air flow with its open end facing forward in the direction of movement of the aircraft, said cylinder being connected to said pitot tube.

7. In a helicopter aircraft having at least one propeller having a plurality of blades mounted on a hub, and means for cyclically and collectively varying the pitch of said blades, the improvement of stabilizing means for stabilizing the aircraft by influencing the cyclic and collective pitch adjustment of said blades in response to the horizontal speed of the aircraft relative to the air, said stabilizing means comprising an annular ring pivotally mounted upon an axis eccentric to the center of said annular ring, air speed responsive means responsive to the horizontal speed of the aircraft relative to the air, means interconnecting said air speed responsive means and said annular ring for pivoting said ring in response to horizontal air speed, and means interconnecting said ring and the propeller blades for transmitting the tilting of said annular ring into the cyclic and collective variation of the position of said blades depending upon the position of said blades relative to said eccentric axis.

References Cited in the file of this patent

UNITED STATES PATENTS

| | | |
|---|---|---|
| 2,389,170 | Stalker | Nov. 20, 1945 |
| 2,425,651 | Stalker | Aug. 12, 1947 |
| 2,439,089 | Hodson | Apr. 6, 1948 |
| 2,611,441 | Slechta | Sept. 23, 1952 |